United States Patent
Wei et al.

(10) Patent No.: US 12,506,821 B2
(45) Date of Patent: Dec. 23, 2025

(54) FOLDABLE ELECTRONIC DEVICE

(71) Applicant: Honor Device Co., Ltd., Shenzhen (CN)

(72) Inventors: Yameng Wei, Shenzhen (CN); Lei Feng, Shenzhen (CN); Mingqian Gao, Shenzhen (CN); Haifei Li, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 236 days.

(21) Appl. No.: 18/043,401

(22) PCT Filed: Sep. 6, 2022

(86) PCT No.: PCT/CN2022/117316
§ 371 (c)(1),
(2) Date: Feb. 28, 2023

(87) PCT Pub. No.: WO2023/124199
PCT Pub. Date: Jul. 6, 2023

(65) Prior Publication Data
US 2024/0297929 A1    Sep. 5, 2024

(30) Foreign Application Priority Data

Dec. 30, 2021 (CN) .......................... 202111647992.3

(51) Int. Cl.
*H04M 1/00* (2006.01)
*G06F 1/16* (2006.01)
*H04M 1/02* (2006.01)

(52) U.S. Cl.
CPC ....... *H04M 1/0222* (2013.01); *H04M 1/0233* (2013.01)

(58) Field of Classification Search
CPC ............. H04M 1/0222; H04M 1/0233; H04M 1/0268; H04M 1/022; G06F 1/1681;
(Continued)

(56) References Cited

U.S. PATENT DOCUMENTS 7,320,152 B2   1/2008   Lowry et al.
8,224,405 B2   7/2012   Lombardi et al.
(Continued)

FOREIGN PATENT DOCUMENTS

CN        1646826 A      7/2005
CN     101048563 A      10/2007
(Continued)

*Primary Examiner* — Rockshana D Chowdhury
(74) *Attorney, Agent, or Firm* — Slater Matsil, LLP

(57) ABSTRACT

Embodiments of this application provide a foldable electronic device, including: a shaft cap, a body, a first cam component, and a second cam component. The first cam component and the second cam component come into pressure contact. The first cam component is configured to be rotatable around a central shaft of the first cam component. The second cam component is configured to be slidable along a direction of the central shaft. A contact surface of the first cam component and the second cam component includes a locking section, an angle between a normal direction of the locking section and the central shaft is less than or equal to a preset value, and a resultant force of a cam driving member in a rotation direction of the cam driving member is o, so that the body is not automatically unfolded or folded, thereby implementing the freestop characteristic.

20 Claims, 7 Drawing Sheets

(58) Field of Classification Search
CPC ...... G06F 1/1652; F16C 11/103; F16C 11/04; F16C 2370/00; F16C 2380/00; H05K 5/0226
See application file for complete search history.

(56) References Cited

U.S. PATENT DOCUMENTS

| | | | |
|---|---|---|---|
| 9,395,761 | B2 | 7/2016 | Yukawa et al. |
| 10,827,633 | B2 | 11/2020 | Yoo et al. |
| 11,023,017 | B2 | 6/2021 | Cheng |
| 11,662,781 | B2 * | 5/2023 | Kang .................. G06F 1/1681 361/679.01 |
| 11,809,239 | B2 * | 11/2023 | Hwang .................. F16C 11/04 |
| 11,846,998 | B2 * | 12/2023 | Wu ...................... H05K 5/0226 |
| 11,944,552 | B2 * | 4/2024 | Hawkes .................. A61F 2/447 |
| 11,947,393 | B2 * | 4/2024 | Xu ........................ G06F 1/1641 |
| 11,956,378 | B2 * | 4/2024 | Kang .................... F16C 11/04 |
| 11,997,807 | B2 * | 5/2024 | Park ...................... H05K 5/0017 |
| 12,079,654 | B2 * | 9/2024 | Yun ...................... G06F 9/5033 |
| 12,097,324 | B2 * | 9/2024 | Oldfield ............ A61M 16/0493 |
| 12,130,671 | B2 * | 10/2024 | Park ........................ E05D 3/122 |
| 12,271,236 | B2 * | 4/2025 | Feng .................... H04M 1/022 |
| 2004/0025299 | A1 * | 2/2004 | Higano ................ G06F 1/1616 16/342 |
| 2004/0137970 | A1 | 7/2004 | Han |
| 2013/0014346 | A1 * | 1/2013 | Ahn ...................... H04M 1/022 16/354 |
| 2013/0250501 | A1 | 9/2013 | Guo |
| 2021/0373612 | A1 * | 12/2021 | Hwang ................ G06F 1/1652 |
| 2022/0317730 | A1 * | 10/2022 | Cho ........................ F16C 11/04 |
| 2022/0413555 | A1 | 12/2022 | Ma |
| 2023/0213056 | A1 * | 7/2023 | Han ...................... G06F 1/1656 455/575.3 |
| 2024/0094784 | A1 * | 3/2024 | Do ........................ G06F 1/1681 |
| 2024/0297929 | A1 * | 9/2024 | Wei ...................... G06F 1/1681 |
| 2025/0138592 | A1 * | 5/2025 | Hwang .................. F16C 11/04 |

FOREIGN PATENT DOCUMENTS

| | | |
|---|---|---|
| CN | 201057218 Y | 5/2008 |
| CN | 201766774 U | 3/2011 |
| CN | 103327758 A | 9/2013 |
| CN | 203384206 U | 1/2014 |
| CN | 104343815 A | 2/2015 |
| CN | 206608457 U | 11/2017 |
| CN | 110582804 A | 12/2019 |
| CN | 111562675 A | 8/2020 |
| CN | 112503085 A | 3/2021 |
| CN | 112540650 A | 3/2021 |
| CN | 112769984 A | 5/2021 |
| CN | 113012569 A | 6/2021 |
| CN | 113280037 A | 8/2021 |
| CN | 214367223 U | 10/2021 |
| CN | 114992230 A | 9/2022 |
| JP | 2004183698 A | 7/2004 |
| JP | 3120899 U | 4/2006 |
| JP | 2008303991 A | 12/2008 |
| KR | 20070000898 U | 8/2007 |
| KR | 102224256 B1 | 3/2021 |
| TW | M259050 U | 3/2005 |

* cited by examiner

FOLDABLE ELECTRONIC DEVICE

CROSS-REFERENCE TO RELATED APPLICATIONS

This application is a National Stage of International Application No. PCT/CN2022/117316, filed on Sep. 6, 2022, which claims priority to Chinese Patent Application No. 202111647992.3, filed on Dec. 30, 2021, both of which are hereby incorporated by reference in their entireties.

TECHNICAL FIELD

This application relates to the field of terminal technologies, and in particular, to a foldable electronic device.

BACKGROUND

In recent years, with the continuous development of screen technologies, especially the emergence of flexible screens, more product forms have been developed for electronic devices. A folding display phone is a currently emerging product form. The folding display phone generally includes a shaft cap and a body on both sides of the shaft cap. The body on each side may be connected to the shaft cap through at least one swing arm. The swing arm may rotate around a rotation shaft in the shaft cap. When a user applies a force to the body to rotate the body, the body may rotate around the rotation shaft to implement unfolding and folding.

In order to provide a damping force when the user opens and closes the body, to improve the hand feeling, a damping component connected to the swing arm is further arranged in the shaft cap. The damping component includes a pair of cam components in pressure contact along a direction of the rotation shaft. The damping force is provided by a friction force generated by surface design of the cam component and the pressure contact, and a pressure that implements the pressure contact of the cam components is provided by an elastic force generated when a spring arranged in the shaft cap deforms.

Technicians hope that the existing folding display phone can have a freestop characteristic, that is, the body of the folding display phone under no external force can stay in the current position, to improve the user experience. One feasible manner for implementing the freestop characteristic is to increase a friction coefficient of a damping component system, where the friction coefficient is related to the quantity and size of springs: the more the springs, the larger the friction coefficient, otherwise, the less the springs, the smaller the friction coefficient; and the larger the spring size, the larger the friction coefficient, otherwise, the smaller the spring size, the smaller the friction coefficient. Therefore, the existing folding display phone generally implements the freestop characteristic by increasing the quantity of springs and the diameter of the springs. However, with an increase of the quantity of springs and the size of the springs, the springs take up more space of the body, resulting in an increase of the overall thickness and weight of the folding display phone, which is not conducive to thinning of the body.

SUMMARY

Embodiments of this application provide a foldable electronic device, which can implement the freestop characteristic while maintaining a thin body. The foldable electronic device includes a shaft cap, a body, a swing arm, a first cam component, a second cam component, and an elastomer. The first cam component and the second cam component are coaxially arranged in the shaft cap; the first cam component is connected to the body through the swing arm and is configured to be rotatable around a central shaft of the first cam component, so that the body is folded or unfolded around the central shaft under the action of an external force; the first cam component includes a first end surface facing the second cam component, the second cam component includes a second end surface facing the first cam component, and the first end surface and the second end surface each include at least one cam surface; the second cam component is configured to be slidable along a direction of the central shaft; the elastomer is connected to the second cam component and is configured to apply an elastic force to the second cam component, so that the first end surface of the first cam component maintains in contact with the second end surface of the second cam component under the action of the elastic force; and in a case that the body is unfolded or folded to a position between fully unfolded and fully folded, the first cam component and the second cam component are in contact with a locking section of the cam surface, and an angle between a normal direction of the locking section and the central shaft is less than or equal to arctan µ, where µ is a friction coefficient between the first cam component and the second cam component.

In the foldable electronic device provided in the embodiments of this application, a contact surface of the first cam component and the second cam component includes at least one cam surface that matches with each other. The cam surface includes a locking section, an angle between a normal direction of the locking section and the central shaft is less than or equal to an arctan function of µ, where µ is a friction coefficient between the first cam component and the second cam component, and a resultant force of a cam driving member in a rotation direction of the cam driving member is 0, so that the body is not automatically unfolded or folded, thereby implementing the freestop characteristic.

In an implementation, the first end surface and the second end surface are matched annular end surfaces; and the first end surface and the second end surface each include an equal quantity of a plurality of cam surfaces, and the plurality of cam surfaces are distributed in an annular array. In this way, the forces on the first cam component and the second cam component along the direction of the central shaft C1 are relatively uniform, which improves the service life of the components.

In an implementation, an angle βby which the locking section rotates around the central shaft C1 is greater than or equal to 90°. Because an angle by which the body on each side of the folding display phone rotates from a fully folded state to a fully unfolded state is 90°, if the angle β by which the locking section rotates around the central shaft C1 is greater than or equal to 90°, the first cam component and the second cam component may be always in contact with the locking section during folding or unfolding of the body, so that the body has the freestop characteristic at any position.

In an implementation, the cam surface includes a rise travel section and a return travel section, and the locking section is a part of the rise travel section; and the locking section rise travel section includes a plurality of locking planes along a lifting direction of the rise travel section, and an angle between a normal direction of any of the locking planes and the central shaft is less than or equal to arctan µ. In this way, with the rotation of the body to different positions, the first cam component and the second cam component can implement surface contact in different locking planes. While the freestop characteristic is provided, a contact stress between the first cam component and the second cam component can be reduced through the surface contact, which improves the service life of the first cam component and the second cam component.

In an implementation, angles between normal directions of the plurality of locking planes and the central shaft decrease sequentially in the lifting direction of the rise travel section. In this way, slopes of the rise travel section can be gradually smooth in the lifting direction of the rise travel section, and finally a smooth transition between a top of the rise travel section and the return travel section can be implemented.

In an implementation, lengths of the plurality of locking planes decrease sequentially in the lifting direction of the rise travel section. In this way, with the slopes of the rise travel section are gradually smooth in the lifting direction of the rise travel section, the locking planes is divided in more detail, so that the slope change at the top of the rise travel section is smoother, which is beneficial to improving the hand feeling when a user rotates the body.

In an implementation, two adjacent locking planes are transitionally connected by a curved surface. In this way, when the user rotates the body to cause the first cam component and the second cam component to slide relative to each other, the contact surface of the first cam component and the second cam component can smoothly transit between the locking planes, thereby avoiding vibration when sliding between two adjacent locking planes, which is beneficial to improving the hand feeling when the user rotates the body.

In an implementation, the locking section starts from a middle and lower part of the rise travel section, is formed to a top of the cam surface along the lifting direction of the rise travel section, and is connected to the return travel section at the top of the cam surface. In this way, compared with the conventional solution, the locking section covers most of the rise travel section and all of a stop section. When the body of the electronic device rotates from the fully folded state to the fully unfolded state, the first cam component and the second cam component can be in contact with the locking section in the entire process, to implement the freestop characteristic.

In an implementation, the locking section is connected to the return travel section through a curved surface. In this way, when the user rotates the body to cause the first cam component and the second cam component to slide relative to each other, the contact surface of the first cam component and the second cam component can smoothly transit between the locking section and the return travel section, thereby avoiding vibration when sliding between the locking section and the return travel section, which is beneficial to improving the hand feeling when the user rotates the body.

In an implementation, a length of the locking section is greater than half of the rise travel section.

In an implementation, the elastomer is a spring, and the spring is arranged coaxially with the second cam component and in a compressed state along the direction of the central shaft to apply the elastic force to the second cam component along the direction of the central shaft.

In an implementation, the locking section is arranged on the at least one cam surface of the first end surface and/or the second end surface.

10—body, 11—display screen, 20—shaft cap, 30—swing arm, 40—damping component, 41—cam driving member, 42—cam driven member, 43—spring, 50—cam surface, 51—rise travel section, 52—stop section, 53—return travel section, 100—first cam component, 200—second cam component, 300—elastomer, 400—cam surface, 410—rise travel section, 411—locking section, 412—locking plane, 420—return travel section, 413—curved surface, 414—curved surface.

DETAILED DESCRIPTION OF ILLUSTRATIVE EMBODIMENTS

In recent years, with the continuous development of screen technologies, especially the emergence of flexible screens that can be freely bent, more product forms have been developed for electronic devices. A folding display phone is a currently emerging product form.

Figure 1:
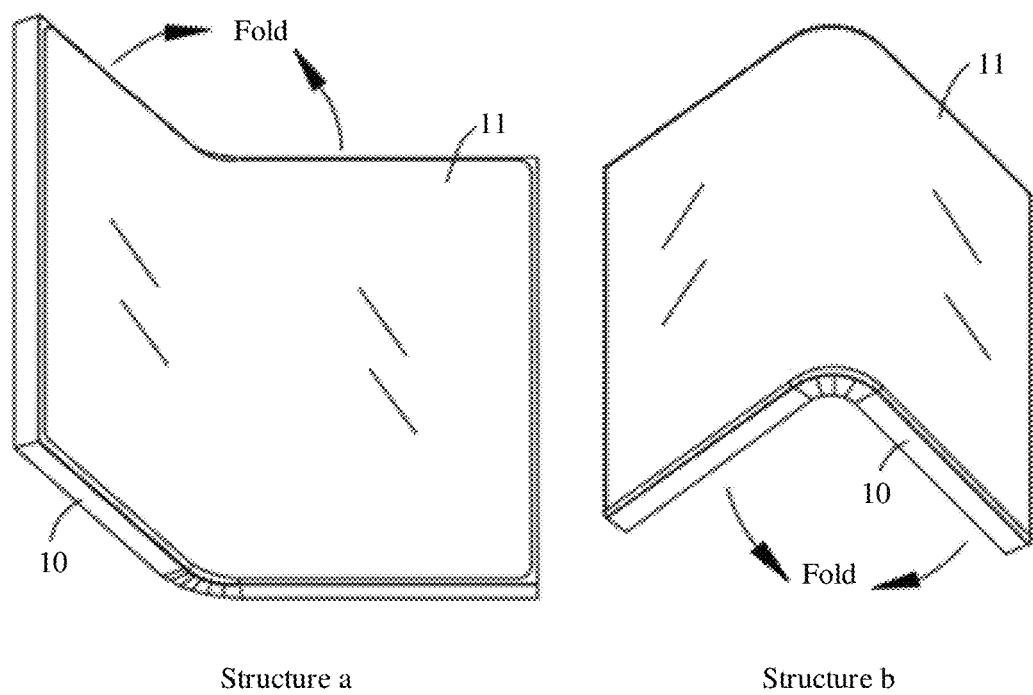
FIG. 1 is a schematic diagram of a form of an existing folding display phone.

FIG. 1 is a schematic diagram of a form of an existing folding display phone. As shown in FIG. 1, the existing folding display phone may include an in-folding display phone and an out-folding display phone according to a bending direction of the screen of the folding display phone. The in-folding display phone is shown as structure a in FIG. 1, and the out-folding display phone is shown as structure b in FIG. 1. A body 10 of the in-folding display phone can be folded to a side of a display screen 11, and the display screen 11 is hidden at an inner side of the body 10 after the body 10 is folded, thereby forming an effect that the display screen 11 is hidden in a folded state of the body 10 and presented in an unfolded state of the body 10. A body 10 of the out-folding display phone can be folded to a back side of a display screen 11, and the display screen 11 surrounds an outer side of the body 10 after the body 10 is folded, thereby forming an effect that the display screen 11 surrounds the body 10 in a folded state of the body 10 and presents a normal direct screen in an unfolded state of the body 10.

Figure 2:
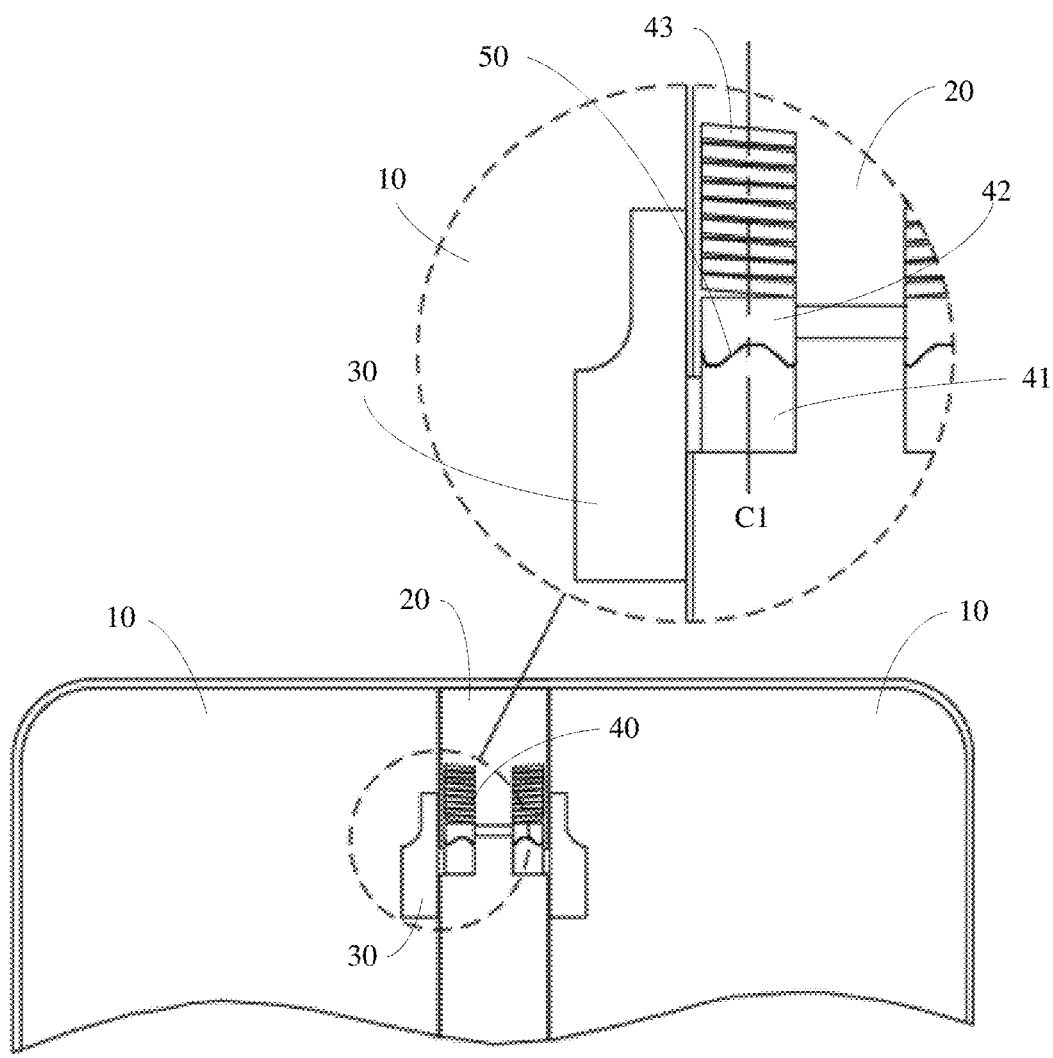
FIG. 2 is a schematic diagram of an internal structure of an existing folding display phone.

FIG. 2 is a schematic diagram of an internal structure of an existing folding display phone. How the body of the existing folding display phone is folded or unfolded is described exemplarily below with reference to FIG. 2. As shown in FIG. 2, the folding display phone includes: a shaft cap 20 and a body 10. The body 10 of the folding display phone that can be folded once may include two parts, respectively arranged on both sides of the shaft cap 20, and the body 10 on each side of the folding display phone may be connected to the shaft cap 20 through at least one swing arm 30. One end of the swing arm 30 is located in the shaft cap 20 and is configured to be rotatable around a rotation shaft in the shaft cap 20, and the other end of the swing arm 30 extends to the body 10 on one side to be connected to the body 10. In this way, when a user applies a force to the body 10 to rotate the body 10, the body 10 may rotate around the rotation shaft to implement unfolding and folding.

In addition, in order to provide a damping force when the user opens and closes the body 10, to improve the hand feeling, a damping component 40 connected to the swing arm 30 is further arranged in the shaft cap 20. The damping component 40 may, for example, be a cam damping component or a gear damping component, and is configured to apply a damping force opposite to a rotation direction to the swing arm 30 when the body 10 drives the swing arm 30 to rotate. The damping force may be transmitted to a hand of the user through the swing arm 30 and the body 10, thereby improving the hand feeling of the user and the classic sense of the device.

FIG. 2 further exemplarily shows a specific structure of the damping component. As shown in FIG. 2, the damping component 40 includes a cam driving member 41, a cam driven member 42, and a spring 43. The swing arm 30 uses a central shaft C1 of the cam driving member 41 as the rotation shaft when the swing arm 30 rotates, and the cam driving member 41 and the cam driven member 42 are arranged side by side and coaxially along a direction of the central shaft C1. The cam driving member 41 is connected to one end of the swing arm 30 located in the shaft cap 20, and the cam driving member 41 is configured to be fixed along the direction of central shaft C1, but rotatable around the central shaft C1. The cam driven member 42 is configured to be non-rotatable around the central shaft C1, but slidable along the direction of the central shaft C1. The spring 43 is connected to the cam driven member 42 and is configured to apply an elastic force Ft to the cam driven member 42. A direction of the elastic force Ft may be parallel to the central shaft C1 and towards the cam driving member 41. In this way, the cam driven member 42 can maintain pressure contact with the cam driving member 41 along the direction of the central shaft C1 under the action of the elastic force Ft. When the user rotates the body 10, the swing arm 30 drives the cam driving member 41 to rotate around the central shaft C1, thereby generating relative sliding with the cam driven member 42 at a contact surface.

Figure 3:
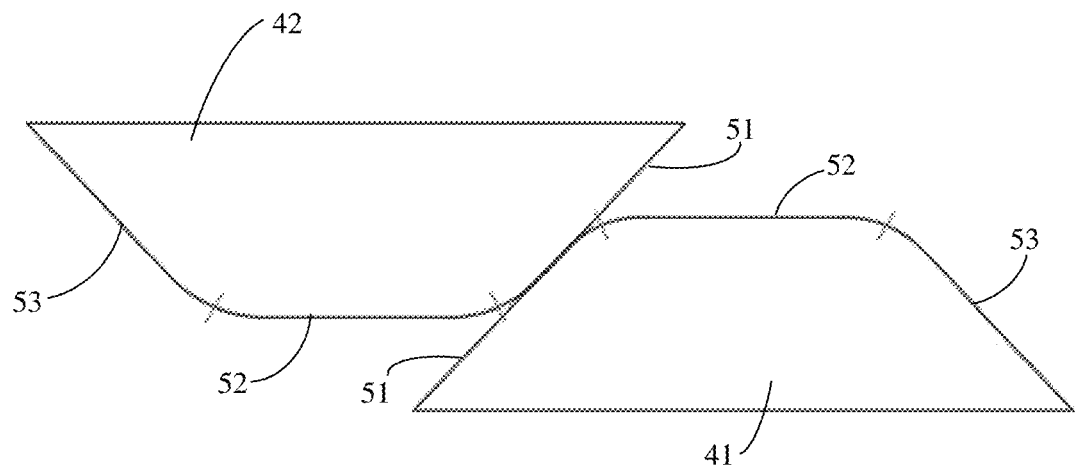
FIG. 3 is a schematic diagram of an existing cam surface.

In order to provide the damping force, the contact surface of the cam driving member 41 and the cam driven member 42 may include cam surfaces 50 that match with each other. FIG. 3 is a schematic diagram of an existing cam surface 50. In FIG. 3, when the body of the folding display device is unfolded from the folded state, the cam driving member 41 slides relative to the cam driven member 42 to the left side in FIG. 3, and the cam driven member 42 slides relative to the cam driving member 41 to the right side in FIG. 3. As shown in FIG. 3, the cam surface 50 sequentially includes, along a sliding direction of the cam driving member 41 or the cam driven member 42, a rise travel section 51, a stop section 52, and a return travel section 53. The rise travel section, the stop section, and the return travel section are technical terms for describing a cam structure in a mechanical field. The rise travel section 51 refers to a section in which the cam driven member 42 is far away from the cam driving member 41 when the cam driving member 41 slides relative to the cam driven member 42, so that the rise travel section 51 has a rising angle along the sliding direction of the cam driving member 41/the cam driven member 42. The stop section 52 refers to a section in which a distance from the cam driven member 42 relative to the cam driving member 41 is constant when the cam driving member 41 slides relative to the cam driven member 42, so that the stop section 52 is perpendicular to the central shaft C1. The return travel section 53 refers to a section in which the cam driven member 42 is brought close to the cam driving member 41 when the cam driving member 41 slides relative to the cam driven member 42, so that the return travel section 53 has a falling angle along the sliding direction of the cam driving member 41/cam driven member 42. Generally, when the body of the folding display phone rotates between a fully folded state and a fully unfolded state, the cam driving member 41 and the cam driven member 42 are in pressure contact and slide at the rise travel section 51 or the stop section 52 of the cam surface.

Figure 4:
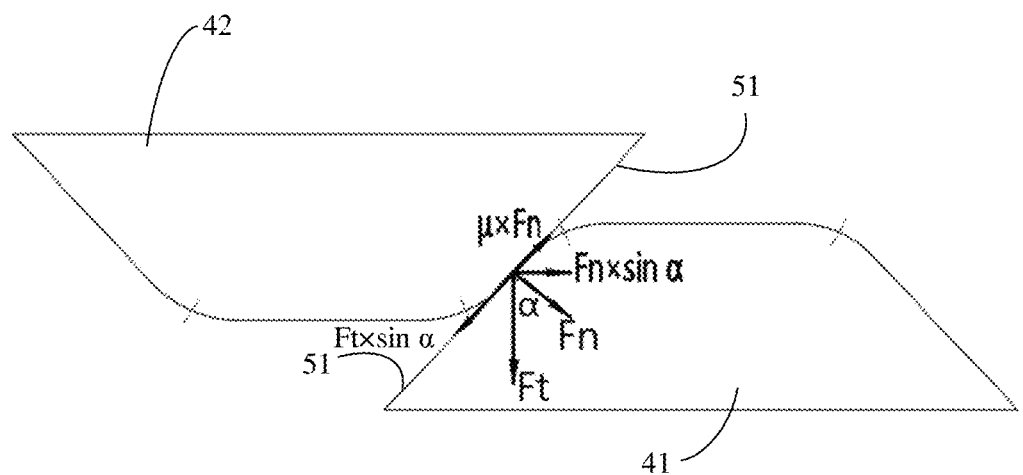
FIG. 4 is a force analysis diagram of a cam driving member and a cam driven member.

FIG. 4 is a force analysis diagram of a cam driving member and a cam driven member. When the cam driving member 41 and the cam driven member 42 are in contact with the rise travel section 51 of the cam surface, the cam driven member 42 applies a pressure Fn to the cam driving member 41 under the action of the elastic force Ft. The pressure Fn acts on a normal direction of the rise travel section 51 of the cam driving member 41, and $Fn=Ft \times \cos \alpha$, where Ft is the elastic force of the spring, and $\alpha$ is an angle between the normal direction of the rise travel section 51 and the elastic force Ft. In this way, Fn generates a component $Fn \times \sin \alpha$ in an opposite direction in which the cam driving member 41 slides, and the component is a part of the damping force. When the user rotates the body, the force applied to the body needs to overcome the component to rotate the cam driving member 41.

Further, as shown in FIG. 4, when the cam driving member 41 and the cam driven member 42 are in contact with the rise travel section 51, a component of the elastic force Ft received by the cam driven member 42 is $Ft \times \sin \alpha$ in a tangential direction of the rise travel section 51, and a component of the elastic force Ft in the normal direction of the rise travel section is $Ft \times \cos \alpha$. Therefore, the cam driven member 42 has a tendency to slide in the tangential direction of the rise travel section 51 under the action of $Ft \times \sin \alpha$. In this case, the cam driven member 42 is subjected to a friction force Fm opposite to the direction of $Ft \times \sin \alpha$ under the action of $Ft \times \cos \alpha$, and the friction force Fm is used for preventing the cam driven member 42 from sliding in the tangential direction of the rise travel section. According to the mechanical knowledge, it can be learnt that: a magnitude of the friction force Fm is related to the friction coefficient $\mu$ between the cam driving member 41 and the cam driven member 42 (the friction coefficient $\mu$ herein integrates a system friction of an overall shafting structure used for implementing rotation of the body in the folding display phone) and a motion state of the cam driving member 41 and the cam driven member 42. When the cam driven member 42 is at rest relative to the cam driving member 41, the friction force Fm exists in the form of a static friction force with a magnitude equal to $Ft \times \sin \alpha$ and a direction opposite to $Ft \times \sin \alpha$, but not greater than $\mu \times Fn$ (that is, $\mu \times Ft \times \cos \alpha$). When the cam driven member 42 slides relative to the cam driving member 41, the friction force Fm exists in the form of a sliding friction force with a magnitude equal to $\mu \times Ft \times \cos \alpha$ and a direction opposite to the sliding direction of the cam driven member 42.

Technicians hope that the existing folding display phone can have a freestop characteristic, that is, the body of the folding display phone under no external force can stay in the current position. According to the mechanical knowledge, it can be seen that: when Ft×sin α>μ×Ft×cos α, it means that a maximum static friction force between the cam driving member 41 and the cam driven member 42 in the rise travel section 51 is less than Ft×sin α, which is insufficient for the cam driven member 42 to reach force balance along the tangential direction of the rise travel section 51, so that the cam driven member 42 and the cam driving member 41 slide relative to each other and cannot implement the freestop characteristic. When Ft×sin α≤μ×Ft×cos α, the maximum static friction between the cam driving member 41 and the cam driven member 42 in the rise travel section 51 is greater than or equal to Ft×sin α, which makes the cam driven member 42 reach the force balance along the tangential direction of the rise travel section 51, so that the cam driving member 41 and the cam driven member 42 maintain a relatively static state to implement the freestop characteristic.

Based on the foregoing conditions for implementing the freestop characteristic, increasing the friction coefficient μ to make Ft×sin α≤μ×Ft×cos α is a feasible means for implementing the freestop characteristic. In the damping component, the friction coefficient μ is related to the quantity and size of springs: the more the springs, the larger the friction coefficient, and the less the springs; and the larger the spring size, the larger the friction coefficient, and the smaller the spring size, the smaller the friction coefficient. Therefore, the existing folding display phone generally implements the freestop characteristic by increasing the quantity of springs and the diameter of the springs to obtain a larger friction coefficient. However, with an increase of the quantity of springs and the size of the springs, the springs take up more space of the body, resulting in an increase of the overall thickness and weight of the folding display phone, which is not conducive to thinning of the body.

The embodiments of this application provide an improved foldable electronic device, which can implement the freestop characteristic while maintaining a thin body. The electronic device may, for example, be a folding display phone, a tablet computer, a laptop computer, an e-book reader, a wireless headset compartment, a wearable device (such as, virtual reality VR glasses, a smartwatch, a smartband, or a head-mounted display device), an electronic device connected to two or more parts in a hinge structure, or an electronic device in another product form. This is not specifically limited herein.

Figure 5:
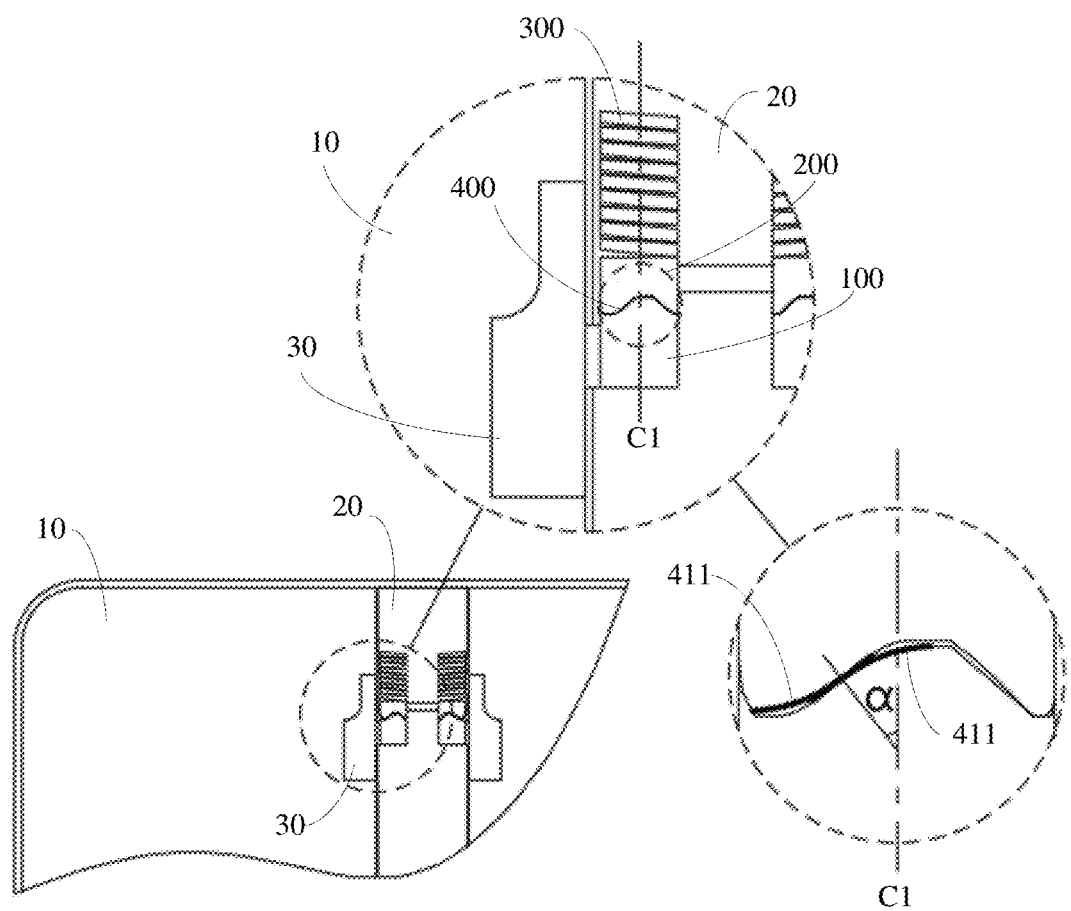
FIG. 5 is a schematic diagram of a partial structure of a foldable electronic device according to an embodiment of this application.

FIG. 5 is a schematic diagram of a partial structure of a foldable electronic device according to an embodiment of this application. As shown in FIG. 5, the electronic device includes: a body 10, a shaft cap 20, a swing arm 30, a first cam component 100, a second cam component 200, and an elastomer 300. The first cam component 100 and the second cam component 200 may be cylindrical structures, arranged coaxially and side by side in the shaft cap 20. The first cam component 100 may, for example, be a cam driving member, and the second cam component 200 may, for example, be a cam driven member. The first cam component 100 is configured to be fixed along a direction of a central shaft C1 of the first cam component 100, but rotatable around the central shaft C1, and the first cam component 100 is connected to the body 10 on one side of the shaft cap 20 through the swing arm 30. In this way, when a user applies a bending force to the body 10, the body 10 can drive the swing arm 30 to rotate around the central shaft C1 of the first cam component 100, so that the body 10 is unfolded or folded around the central shaft C1. The second cam component 200 is configured to be fixed in a direction perpendicular to the central shaft C1, but slidable along the direction of the central shaft C1. The elastomer 300 is connected to the second cam component 200, and is configured to apply an elastic force Ft to the second cam component 200. A direction of the elastic force Ft is parallel to the central shaft C1 and towards the first cam component 100. In this way, the second cam component 200 can maintain pressure contact with the first cam component 100 along the direction of the central shaft C1 under the action of the elastic force Ft. When the first cam component 100 rotates around the central shaft C1, the first cam component 100 and the second cam component 200 slide relative to each other on a contact surface of the first cam component 100 and the second cam component 200.

Further, as shown in FIG. 5, the contact surface of the first cam component 100 and the second cam component 200 may include at least one cam surface 400 that matches with each other. The cam surface 400 includes a locking section 411 (a section with bold lines in FIG. 5), and an angle α between a normal direction of the locking section 411 and the central shaft C1 is less than or equal to an arctan function of μ, that is, α≤arctan μ, where μ is a friction coefficient between the first cam component 100 and the second cam component 200, and the friction coefficient integrates a system friction of an overall shafting structure used for implementing rotation of the body in the electronic device.

In this way, when the first cam component 100 comes into contact with the second cam component 200 in the locking section 411, because α≤arctan μ, a component Ft×sin α of the elastic force Ft in a tangential direction of the locking section 411 and a component Ft×cos α in the normal direction can satisfy Ft×sin α≤μ×Ft×cos α, a maximum static friction force between the first cam component 100 and the second cam component 200 in the locking section 411 is greater than or equal to Ft×sin α, which makes the second cam component 200 reach force balance along the tangential direction of the locking section 411, so that the first cam component 100 and the second cam component 200 can maintain a relatively static state to implement the freestop characteristic.

In this embodiment of this application, the elastomer 300 may be a component that can generate an elastic force by deformation, such as a spring or an elastic piece. When the elastomer 300 is implemented by using the spring, the spring is arranged on one end of the second cam component 200 opposite to the first cam component 100, and is arranged coaxially with the second cam component 200. One end of the spring is in contact with the second cam component 200, and is configured in a compressed state along the direction of the central shaft C1. In this way, the spring can apply an elastic force Ft to the second cam component 200 along the direction of the central shaft C1, and the elastic force Ft is proportional to an amount of compression of the spring, that is, Ft=kx, where k is a stiffness coefficient of the spring and x is the amount of compression of the spring.

Figure 6:
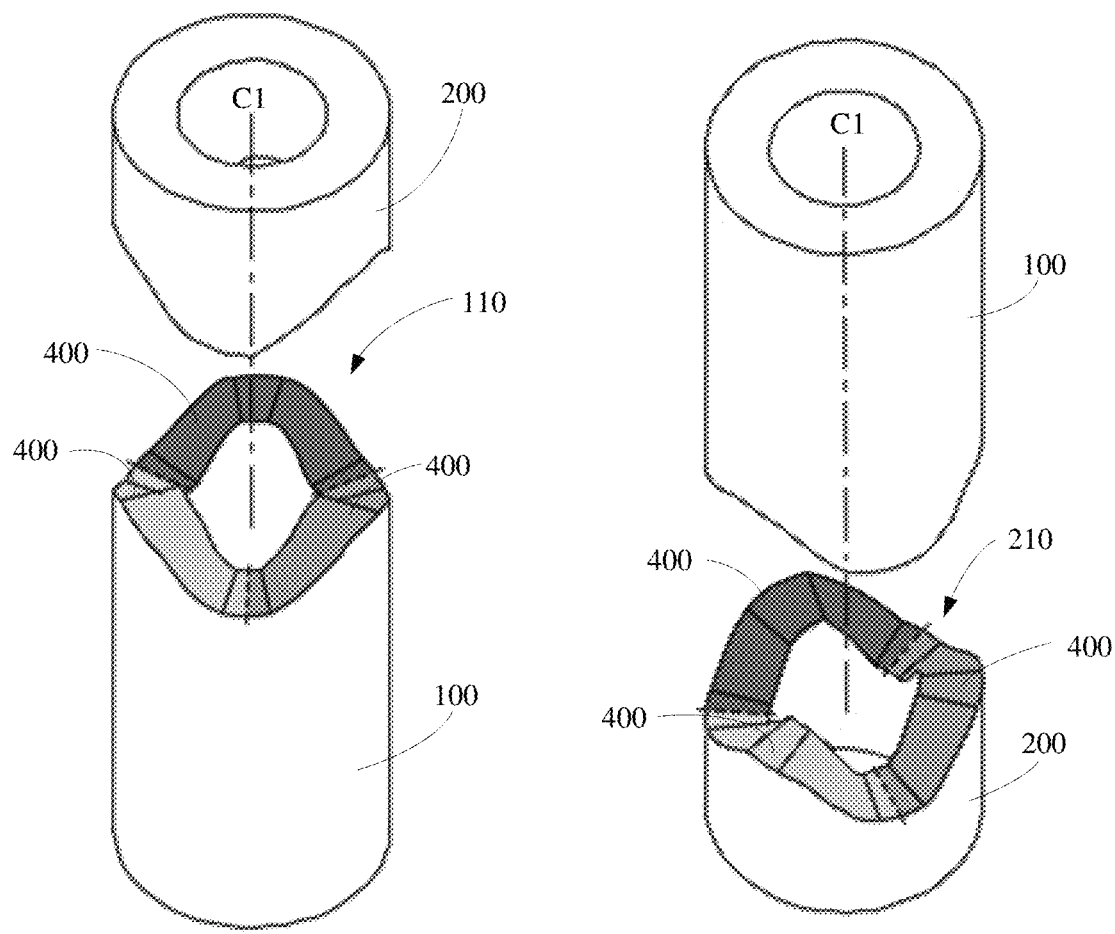
FIG. 6 is a schematic structural diagram of a contact surface according to an embodiment of this application.

FIG. 6 is a schematic structural diagram of a contact surface according to an embodiment of this application. As shown in FIG. 6, the first cam component 100 and the second cam component 200 may each include an annular end surface that matches with each other. For ease of description, herein, the annular end surface of the first cam component 100 is referred to as a first end surface 110 and the annular end surface of the second cam component 200 is referred to as a second end surface 210. The first end surface 110 and the second end surface 210 may include an equal quantity of a plurality of cam surfaces 400 (represented by shadows of different depths in FIG. 6), and the plurality of cam surfaces 400 are sequentially connected end to end and distributed in an annular array around the direction of the central shaft C1. When the first end surface 110 and the second end surface 210 include the equal quantity of the plurality of cam surfaces 400, the plurality of cam surfaces 400 on the first end surface 110 may form pressure contact with the plurality of cam surfaces 400 on the second end surface 210 in a one-to-one correspondence. When the first cam component 400 rotates around the central shaft C1, the first cam component 100 and the second cam component 200 are relatively twisted around the central shaft C1, thereby generating relative sliding.

Further, as shown in FIG. 6, in an implementation, the first end surface 110 and the second end surface 210 may each include three cam surfaces 400, and an angle between two adjacent cam surfaces 400 is 120°. In this way, a projection of each cam surface 400 along the direction of the central shaft C1 is an arc with a central angle of 120°, each cam surface 400 forms one-third of the annular end surface, and the first end surface 110 and the second end surface 210 may uniformly form three pressure contacts around the central shaft C1, so that the forces on the first cam component 100 and the second cam component 200 along the direction of the central shaft C1 are relatively uniform, which improves the service life of the components.

Figure 7:
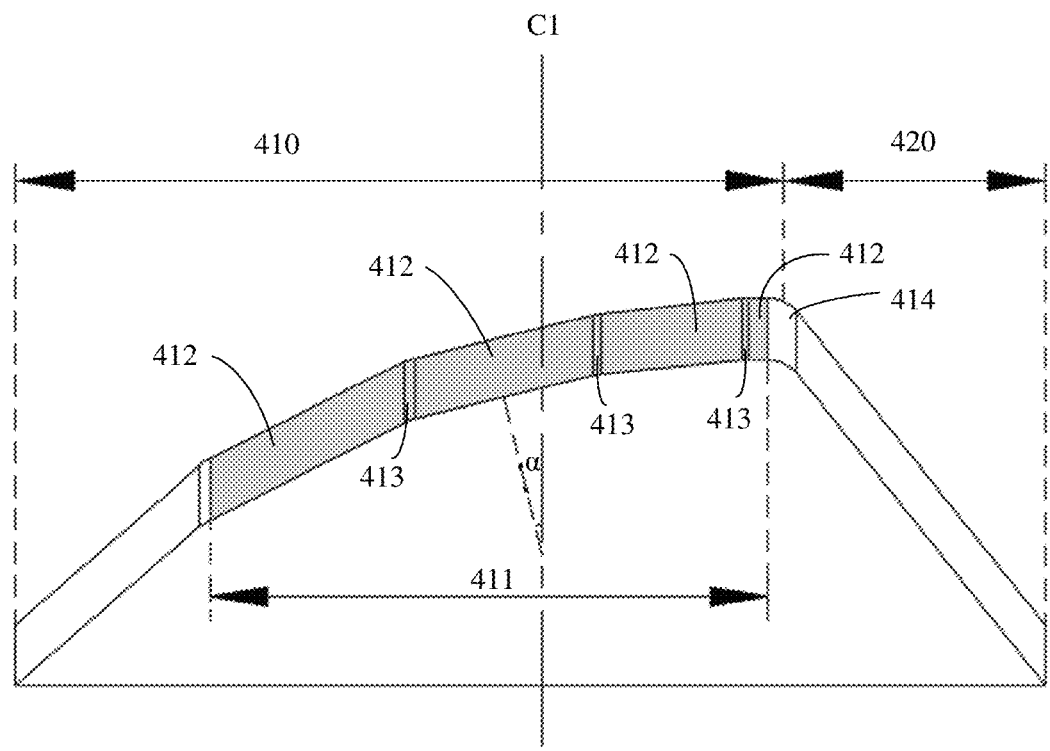
FIG. 7 is a schematic structural diagram of a cam surface according to an embodiment of this application.

FIG. 7 is a schematic structural diagram of a cam surface 400 according to an embodiment of this application.

Figure 8:
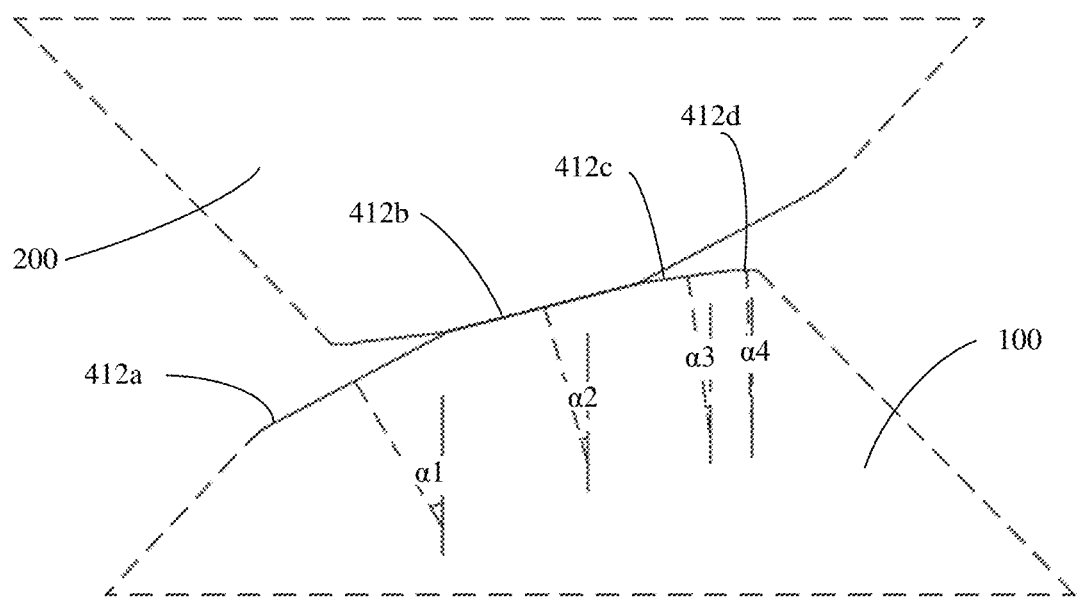
FIG. 8 is a schematic diagram of a cam driving member and a cam driven member in contact with a locking section according to an embodiment of this application.

FIG. 8 is a schematic diagram of a first cam component 100 and a second cam component 200 in contact with a locking section 411 according to an embodiment of this application.

In order to facilitate the description of a structure of the cam surface 400, the cam surface 400 is expanded from the arc in FIG. 7 and FIG. 8.

As shown in FIG. 7 and FIG. 8, in an implementation, the cam surface 400 sequentially includes, along a sliding direction of the first cam component 100 or the second cam component 200, a rise travel section 410 and a return travel section 420. The rise travel section 410 refers to a section in which the second cam component 200 is far away from the first cam component 100 when the first cam component 100 slides relative to the second cam component 200, and the rise travel section 410 has a rising angle along the sliding direction of the second cam component 200 relative to the first cam component 100. The return travel section 420 refers to a section in which the second cam component 200 is brought close to the first cam component 100 when the first cam component 100 slides relative to the second cam component 200, and the return travel section 420 has a falling angle along the sliding direction of the second cam component 200 relative to the first cam component 100.

Compared with the cam surface shown in FIG. 3, the cam surface 400 shown in FIG. 7 and FIG. 8 of the embodiments of this application includes only the rise travel section 410 and the return travel section 420, but does not include the stop section, and the rise travel section 410 is directly connected to the return travel section 420. For the cam surface 400 shown in FIG. 7 and FIG. 8, it can be considered that, based on the cam surface 400 shown in FIG. 3, the rise travel section 410 is extended to the region of the original stop section to replace the original stop section, thereby increasing the length of the rise travel section 410. When a lifting height of the rise travel section 410 is unchanged, increasing the length of the rise travel section 410 is beneficial to making the slope of the rise travel section 410 smoother and reducing an angle $\alpha$ between the normal direction of the rise travel section 410 and the central shaft C1.

In the embodiments of this application, the locking section 411 (represented by a shadow in FIG. 7 and a solid line in FIG. 8) may extend along the lifting direction of the rise travel section 410 from the middle and lower part of the rise travel section 410 all the way to a top of the rise travel section 410 and be connected to the return travel section 420 at the top of the rise travel section 410. Compared with the structure shown in FIG. 3, the locking section 411 covers most of the rise travel section 51 and all of the stop section 52. In this way, when the body of the electronic device rotates from the fully folded state to the fully unfolded state, the first cam component 100 and the second cam component 200 can be in contact with the locking section 411 almost in the entire process.

Further, as shown in FIG. 7 and FIG. 8, in an implementation, the locking section 411 includes a plurality of locking planes 412 along the lifting direction of the rise travel section 410. Angles $\alpha$ between normal directions of different locking planes 412 and the central shaft C1 are different, but the angle $\alpha$ between the normal direction of any locking plane 412 and the central shaft C1 is less than or equal to arctan $\mu$. In this way, with the rotation of the body to different positions, the first cam component 100 and the second cam component 200 can implement surface contact in different locking planes 412. While the freestop characteristic is provided, a contact stress between the first cam component 100 and the second cam component 200 can be reduced through the surface contact, which improves the service life of the first cam component 100 and the second cam component 200.

Further, as shown in FIG. 7 and FIG. 8, in an implementation, angles $\alpha$ between normal direction of the plurality of locking planes 412 and the central shaft C1 decrease sequentially in the lifting direction of the rise travel section 410. In this way, slopes of the rise travel section 410 can be gradually smooth in the lifting direction of the rise travel section 410, and finally a smooth transition between the top of the rise travel section 410 and the return travel section 420 can be implemented. For example, if the locking section 411 sequentially includes, along the lifting direction of the rise travel section 410, four locking planes 412a, 412b, 412c, and 412d, respectively corresponding to the angles $\alpha 1$, $\alpha 2$, $\alpha 3$, and $\alpha 4$, arctan $\mu > \alpha 1 > \alpha 2 > \alpha 3 > \alpha 4 \geq 0°$ is satisfied.

Further, as shown in FIG. 7 and FIG. 8, in an implementation, lengths of the plurality of locking planes 412 decrease sequentially in the lifting direction of the rise travel section 410. In this way, with the slopes of the rise travel section 410 are gradually smooth in the lifting direction of the rise travel section 410, the locking planes 412 is divided in more detail, so that the slope change at the top of the rise travel section 410 is smoother, which is beneficial to improving the hand feeling when a user rotates the body.

Further, as shown in FIG. 7 and FIG. 8, in an implementation, two adjacent locking planes 412 are transitionally connected by a curved surface 413. In this way, when the user rotates the body to cause the first cam component 100 and the second cam component 200 to slide relative to each other, the contact surface of the first cam component 100 and the second cam component 200 can smoothly transit between the locking planes 412, thereby avoiding vibration when sliding between two adjacent locking planes 412, which is beneficial to improving the hand feeling when the user rotates the body.

Further, as shown in FIG. 7 and FIG. 8, in an implementation, the locking section 411 is connected to the return travel section 420 through a curved surface 414. In this way, when the user rotates the body to cause the first cam component 100 and the second cam component 200 to slide relative to each other, the contact surface of the first cam component 100 and the second cam component 200 can smoothly transit between the locking section 411 and the return travel section 420, thereby avoiding vibration when sliding between the locking section 411 and the return travel section 420, which is beneficial to improving the hand feeling when the user rotates the body.

Figure 9:
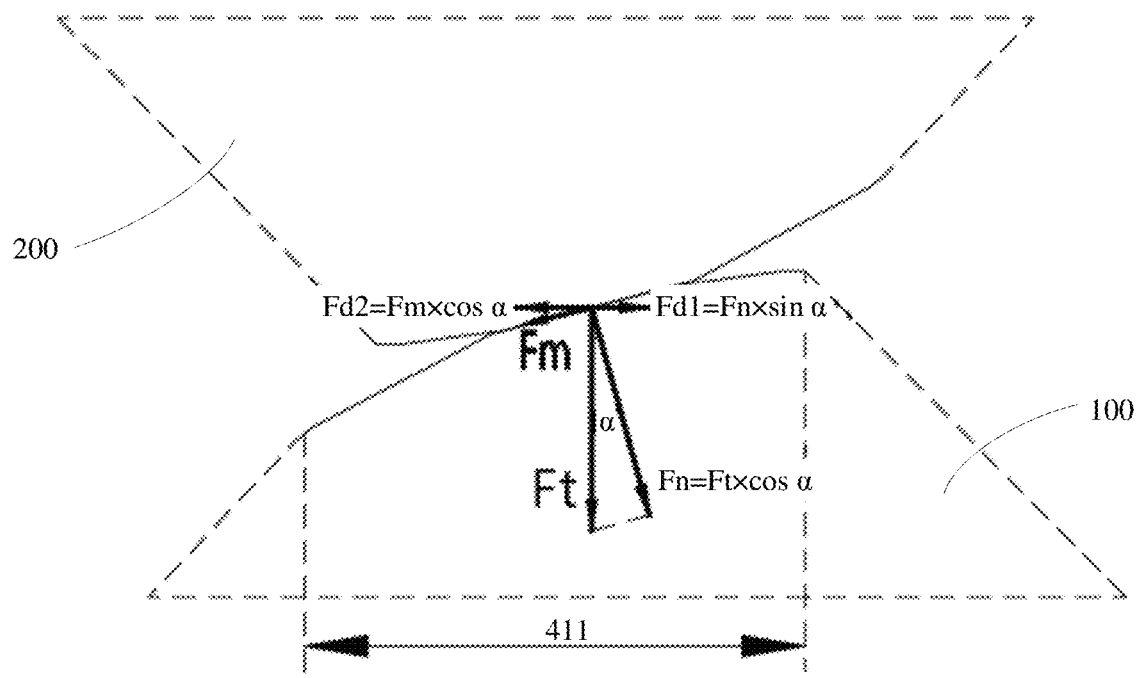
FIG. 9 is a force analysis diagram of a cam driving member and a cam driven member in contact with a locking section according to an embodiment of this application.

FIG. 9 is a force analysis diagram of a first cam component 100 and a second cam component 200 in contact with a locking section 411.

As shown in FIG. 9, when the first cam component 100 comes into contact with the second cam component 200 in the locking section 411, on one hand, the second cam component 200 applies a pressure Fn, where Fn=Ft×cos α, to the first cam component 100 along the normal direction perpendicular to the locking section 411 at an elastic force Ft=k×x, the pressure Fn generates a component Fd1 in a rotation direction of the first cam component 100 (that is, the direction perpendicular to the rotation shaft C1), where Fd1=Fn×sin α=Ft×cos α×sin α, the component Fd1 causes the first cam component 100 to have a tendency to rotate to the right side in FIG. 9; on the other hand, the first cam component 100 is also subjected to a friction force Fm on a contact surface between the first cam component 100 and the second cam component 200 under the action of the pressure Fn, a direction of the friction force Fm is parallel to the tangential direction of the locking section 411 for preventing the first cam component 100 from sliding along the tangential direction of the locking section 411, and the friction force Fm generates a component Fd2, where Fd2=Fm×cos α, opposite to the direction of the component Fd1.

According to the mechanical knowledge, it can be learnt that: if the first cam component 100 is made to maintain at rest under no bending force of the user, that is, to implement the freestop characteristic, Fd1=Fd2, that is, Fn×sin α=Fm× cos α, where the friction force Fm is a static friction force with a maximum value of μ×Ft×cos α. Therefore, a condition that Fd1=Fd2 holds is that Ft×cos α×sin α≤μ×Ft×cos α×cos α, that is, tan α≤μ. That is, when α≤arctan μ, a resultant force of the first cam component 100 in a rotation direction of the first cam component 100 is 0, so that the body is not automatically unfolded or folded, thereby implementing the freestop characteristic;

When α>arctan μ, Fd1>Fd2, and the resultant force of the first cam component 100 in the rotation direction of the first cam component 100 is greater than 0. Therefore, the first cam component 100 rotates to cause the body to be automatically unfolded or folded without the freestop characteristic.

In the embodiments of this application, θ=arctan μ is defined as a self-locking angle, and when μ≈0.2, θ≈10°.

Figure 10:
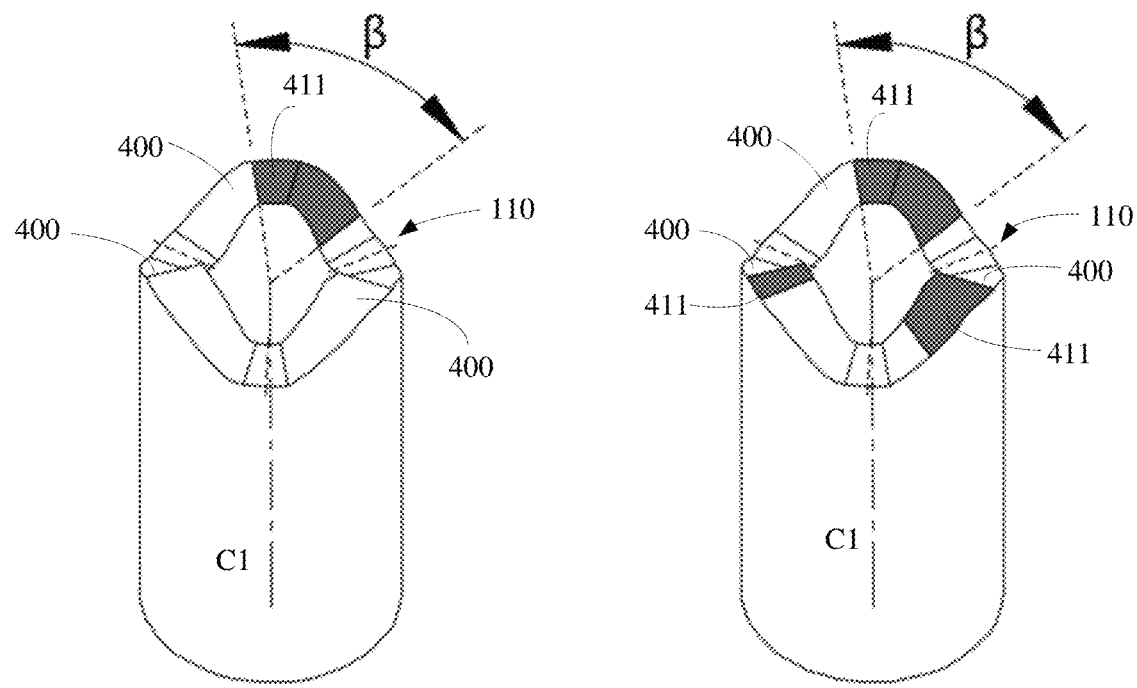
FIG. 10 is a schematic diagram of distribution of cam surfaces on an annular end surface according to an embodiment of this application.

FIG. 10 is a schematic diagram of distribution of cam surfaces on an annular end surface according to an embodiment of this application.

As shown in FIG. 10, in an implementation, when the annular end surface includes a plurality of cam surfaces 400, the locking section 411 may be arranged on at least one cam surface 400 of the annular end surface. Using the first end surface 110 as an example, when the first end surface includes a plurality of cam surfaces 400, as shown in manner a in FIG. 10, the locking section 411 may be arranged on a part of the cam surface 400, and the locking section 411 is not arranged on the remaining cam surfaces 400; and as shown in manner b in FIG. 10, the locking section 411 may also be arranged on each cam surface 400.

In addition, it may be understood that, for the folding display phone in the form shown in FIG. 1, an angle by which the body on each side of the folding display phone rotates from a fully folded state to a fully unfolded state is 90°. Based on this, as shown in FIG. 10, in this embodiment of this application, preferably, an angle β by which each locking section 411 rotates around the central shaft C1 is greater than or equal to 90°, or close to 90°, for example, any angle between 45° to 90°. In this way, when the body is folded or unfolded, the first cam component and the second cam component can always or mostly be in contact with the locking section 411, so that the body has the freestop characteristic in any position or most positions.

It can be learned from the above technical solutions that, in the electronic device provided in the embodiments of this application, the contact surface of the first cam component and the second cam component includes at least one cam surface that matches with each other. The cam surface includes a locking section, an angle between a normal direction of the locking section and the central shaft is less than or equal to an arctan function of μ, where μ is a friction coefficient between the first cam component and the second cam component, and a resultant force of a cam driving member in a rotation direction of the cam driving member is 0, so that the body is not automatically unfolded or folded, thereby implementing the freestop characteristic.

It is easy to understand that a person skilled in the art may combine, split, recombine the embodiments of this application based on several embodiments provided in this application to obtain other embodiments, and all of the embodiments fall within the protection scope of this application.

The objectives, technical solutions, and benefits of this application are further described in detail in the foregoing specific embodiments. It should be understood that the foregoing descriptions are merely specific embodiments of this application, but are not intended to limit the protection scope of this application. Any modification, equivalent replacement or improvement made based on the technical solutions in this application shall fall within the protection scope of this application.

What is claimed is:

1. A foldable electronic device, comprising:
a shaft cap, a body, a swing arm, a first cam component, a second cam component, and an elastomer, and wherein:
the first cam component and the second cam component are coaxially arranged in the shaft cap;
the first cam component is connected to the body through the swing arm and is configured to be rotatable around a central shaft of the first cam component, so that the body is folded or unfolded around the central shaft under action of an external force;
the first cam component comprises a first end surface facing the second cam component, the second cam component comprises a second end surface facing the first cam component, and the first end surface and the second end surface each comprise at least one cam surface;
the second cam component is configured to be slidable along a direction of the central shaft;
the elastomer is connected to the second cam component and is configured to apply an elastic force to the second cam component, so that the first end surface of the first cam component maintains in contact with the second end surface of the second cam component under action of the elastic force;

in a case that the body is unfolded or folded to a position between fully unfolded and fully folded, the first cam component and the second cam component are in contact with a locking section of the at least one cam surface, and an angle between a normal direction of the locking section and the central shaft is less than or equal to arctan μ, wherein μ is a friction coefficient between the first cam component and the second cam component;

the first end surface and the second end surface are matched annular end surfaces;

the first end surface and the second end surface each comprise an equal quantity of cam surfaces, and the cam surfaces of each of the first end surface and the second end surface are respectively distributed in an annular array;

wherein an angle β by which the locking section rotates around the central shaft is greater than or equal to 90°;

wherein each cam surface comprises a rise travel section and a return travel section, and the locking section is a part of a rise travel section of a corresponding cam surface; and wherein the locking section comprises a plurality of locking planes along a lifting direction of the rise travel section of the corresponding cam surface, and an angle between a normal direction of any of the plurality of locking planes and the central shaft is less than or equal to arctan μ.

2. The electronic device according to claim 1, wherein angles between normal directions of the plurality of locking planes and the central shaft decrease sequentially in the lifting direction of the rise travel section of the corresponding cam surface.

3. The electronic device according to claim 2, wherein lengths of the plurality of locking planes decrease sequentially in the lifting direction of the rise travel section of the corresponding cam surface.

4. The electronic device according to claim 3, wherein in a case that the body is unfolded or folded to a first position, the first cam component is in surface contact with the second cam component through the plurality of locking planes.

5. The electronic device according to claim 4, wherein two adjacent locking planes are transitionally connected by a curved surface.

6. The electronic device according to claim 5, wherein the locking section starts from a middle and lower part of the rise travel section of the corresponding cam surface, is formed to a top of the corresponding cam surface along the lifting direction of the rise travel section of the corresponding cam surface, and is connected to the return travel section of the corresponding cam surface at the top of the corresponding cam surface.

7. The electronic device according to claim 6, wherein the locking section is connected to the return travel section of the corresponding cam surface through a curved surface.

8. The electronic device according to claim 7, wherein a length of the locking section is greater than half of the rise travel section of the corresponding cam surface.

9. The electronic device according to claim 8, wherein the elastomer is a spring, and the spring is arranged coaxially with the second cam component and in a compressed state along the direction of the central shaft to apply the elastic force to the second cam component along the direction of the central shaft.

10. The electronic device according to claim 9, wherein the locking section is arranged on the at least one cam surface of the at least one of the first end surface or the second end surface.

11. A foldable electronic device, comprising:

a shaft cap, a body, a swing arm, a first cam component, a second cam component, and a spring, and wherein:

the first cam component and the second cam component are coaxially arranged in the shaft cap;

the first cam component is connected to the body through the swing arm and is configured to be rotatable around a central shaft of the first cam component, and the first cam component is fixed from moving axially along the central shaft of the first cam component;

the first cam component comprises a first end surface facing the second cam component, the second cam component comprises a second end surface facing the first cam component, and the first end surface and the second end surface each comprise at least one cam surface;

the second cam component is configured to be slidable along a direction of the central shaft and fixed from rotating around the central shaft;

the spring is connected to the second cam component and is configured to apply an elastic force to the second cam component, so that the first end surface of the first cam component maintains in contact with the second end surface of the second cam component under action of the elastic force;

in a case that the body is unfolded or folded to a position between fully unfolded and fully folded, the first cam component and the second cam component are in contact with a locking section of the at least one cam surface of the first end surface or the second end surface, and an angle between a normal direction of the locking section and the central shaft is less than or equal to arctan μ, wherein μ is a friction coefficient between the first cam component and the second cam component;

the first end surface and the second end surface are matched annular end surfaces;

the first end surface and the second end surface each comprise an equal quantity of cam surfaces, and the cam surfaces of each of the first end surface and the second end surface are respectively distributed in an annular array;

wherein an angle β by which the locking section rotates around the central shaft is greater than or equal to 90°;

wherein each cam surface comprises a rise travel section and a return travel section, and the locking section is a part of a rise travel section of a corresponding cam surface; and wherein the locking section comprises a plurality of locking planes along a lifting direction of the rise travel section of the corresponding cam surface, and an angle between a normal direction of any of the plurality of locking planes and the central shaft is less than or equal to arctan μ.

12. The electronic device according to claim 11, wherein angles between normal directions of the plurality of locking planes and the central shaft decrease sequentially in the lifting direction of the rise travel section of the corresponding cam surface.

13. The electronic device according to claim 12, wherein lengths of the plurality of locking planes decrease sequentially in the lifting direction of the rise travel section of the corresponding cam surface.

14. The electronic device according to claim 13, wherein in a case that the body is unfolded or folded to a first position, the first cam component is in surface contact with the second cam component through the plurality of locking planes.

15. The electronic device according to claim 14, wherein two adjacent locking planes are transitionally connected by a curved surface.

16. The electronic device according to claim 15, wherein the locking section starts from a middle and lower part of the rise travel section of the corresponding cam surface, is formed to a top of the corresponding cam surface along the lifting direction of the rise travel section of the corresponding cam surface, and is connected to the return travel section of the corresponding cam surface at the top of the corresponding cam surface.

17. The electronic device according to claim 16, wherein the locking section is connected to the return travel section of the corresponding cam surface through a curved surface.

18. The electronic device according to claim 17, wherein a length of the locking section is greater than half of the rise travel section of the corresponding cam surface.

19. The electronic device according to claim 18, wherein the spring is arranged coaxially with the second cam component and in a compressed state along the direction of the central shaft to apply the elastic force to the second cam component along the direction of the central shaft.

20. The electronic device according to claim 19, wherein the locking section is arranged on the at least one cam surface of the at least one of the first end surface or the second end surface.

* * * * *